United States Patent [19]

Tanaka et al.

[11] Patent Number: 4,923,433
[45] Date of Patent: May 8, 1990

[54] TRANSMISSION RATIO CONTROL SYSTEM FOR A CONTINUOUSLY VARIABLE TRANSMISSION

[75] Inventors: Hiroshi Tanaka; Keiji Sato, both of Tokyo, Japan

[73] Assignee: Fuji Jukogyo Kabushiki Kaisha, Tokyo, Japan

[21] Appl. No.: 310,067

[22] Filed: Feb. 9, 1989

[30] Foreign Application Priority Data

Feb. 22, 1988 [JP] Japan ................................. 63-040255
Feb. 22, 1988 [JP] Japan ................................. 63-040256

[51] Int. Cl.$^5$ ............................................ F16H 11/06
[52] U.S. Cl. .......................................... 474/11; 474/28
[58] Field of Search ...................... 474/11, 12, 17, 18, 474/28, 69, 70; 74/865–869

[56] References Cited

U.S. PATENT DOCUMENTS

| | | | |
|---|---|---|---|
| 4,672,864 | 6/1987 | Morimoto | 474/28 X |
| 4,734,082 | 3/1988 | Tezuka | 474/28 |
| 4,761,153 | 8/1988 | Morimoto | 474/28 |
| 4,764,156 | 8/1988 | Ohkumo | 474/28 |

*Primary Examiner*—Thuy M. Bui
*Attorney, Agent, or Firm*—Martin A. Farber

[57] ABSTRACT

A control system for a continuously variable transmission for a motor vehicle has a transmission ratio control valve for controlling the transmission ratio. The system has a drive pulley having a shiftable disc and a hydraulic cylinder for operating the disc, a driven pulley having a shiftable disc and a hydraulic cylinder for operating the disc, a belt engaged with both pulleys. When output torque of an automotive engine increases, the transmission ratio control valve is operated to increase pressure of oil supplied to the cylinder of the drive pulley, thereby preventing the transmission from downshifting.

6 Claims, 9 Drawing Sheets

PRIOR ART

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio of the transmission.

Referring to FIG. 6, a continuously variable belt-drive transmission has an endless belt 16 running over a drive pulley 14 and a driven pulley 15. Each pulley comprises a hydraulically shiftable conical disc which is axially shifted by a fluid operated servo device so as to vary the running diameter of the belt on the pulleys in dependency on driving conditions. The system is provided with a line pressure control valve and a transmission ratio control valve. Each valve has a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The output of an engine is transmitted to the drive pulley through a clutch. The line pressure is controlled to prevent the belt from slipping on the pulleys in order to transmit the output of the engine.

At the start of the vehicle, the transmission ratio is set at a maximum value. When the vehicle speed and engine speed reach set values under a driving condition, the transmission ratio starts to change (upshift). The transmission ratio is controlled to a desired transmission ratio.

However, there is a problem that the transmission ratio can not be exactly controlled becuase of reasons explained hereinafter.

When the torque of the engine increases, the belt in the slack side 16a is compressed, so that the belt is outwardly expanded as shown by a dotted line as shown in FIG. 6. However, since the length of the belt is constant, the belt acts to push the movable conical disc of the drive pulley 14 to reduce the running diameter of the pulley as shown by the dotted line. Thus, the transmission ratio is increased (downshift). As a result, it is difficult to control the transmission ratio to a desired ratio.

SUMMARY OF THE INVENTION

The object of the present invention is to provide a system which may correct the deviation of the belt which occurs when the engine torque is increased.

According to the present invention, there is provided a control system for a continuously variable transmission for transmitting the power of an internal combustion engine mounted on a motor vehicle, the system comprising a drive pulley having a hydraulically shiftable disc and a hydraulic cylinder for operating the disc, a driven pulley having a hydraulically shiftable disc and a hydraulic cylinder for operating the disc, a belt engaged with both pulleys, a first hydraulic circuit having a pump for supplying oil to both the hydraulic cylinders, a transmission ratio control valve for controlling the oil supplied to the cylinder of the drive pulley to change the transmission ratio to a desired transmission ratio, a second hydraulic circuit having a solenoid operated valve for operating the transmission ratio control valve.

The system has detector means for detecting increase of output torque of the engine and for producing an engine torque increase signal, calculator means for calculating a desired transmission ratio in accordance with driving conditions of the vehicle, control means for producing a driving signal for operating the solenoid operated valve so as to control the transmission ratio to the desired transmission ratio, and correcting means responsive to the engine torque increase signal to correct the driving signal so as to increase pressure of oil supplied to the cylinder of the drive pulley.

The other objects and features of this invention will become understood from the following description with reference to the accompanying drawings.

DETAILED DESCRIPTION OF THE PREFERRED EMBODIMENT

Figure 1:
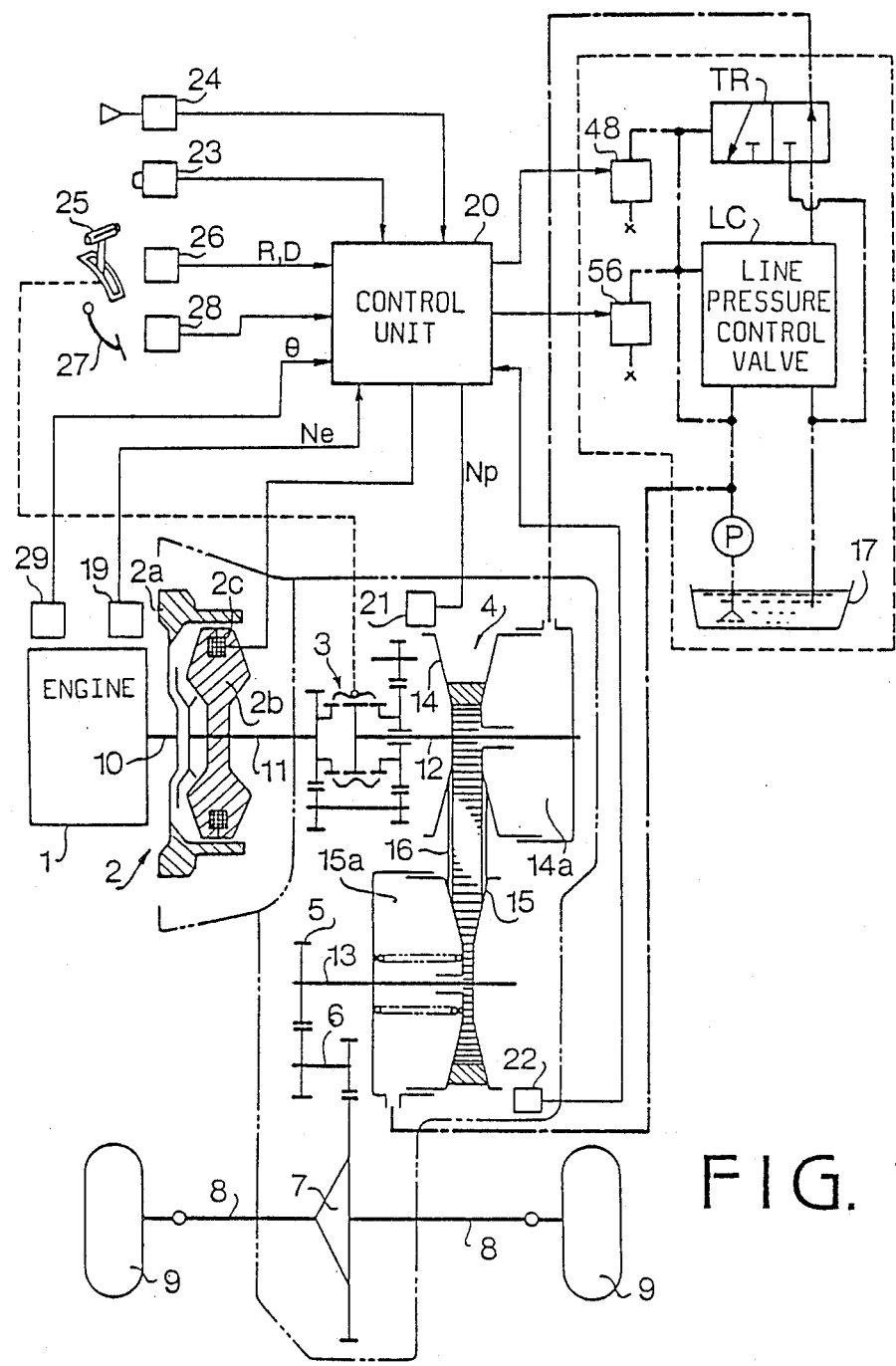
FIG. 1 is a schematic illustration of a continuously variable belt-drive transmission to which the present invention is applied.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to a crankshaft 10 of the engine 1, a driven member 2b secured to an input shaft 11 of the transmission 4, and a magnetizing coil 2c provided in the driven member 2b. Magnetic powder is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D) and a reverse driving position (R).

The continuously variable belt-drive automatic transmission 4 has the main shaft 12 and the output shaft 13 provided in parallel with the main shaft 12. The drive pulley 14 provided with a hydraulic cylinder 14a is mounted on the main shaft 12. The driven pulley 15 provided with a hydraulic cylinder 15a is mounted on the output shaft 13. The drive belt 16 engages with the drive pulley 14 and the driven pulley 15. Hydraulic cylinders 14a and 15a are communicated with an oil hydraulic control circuit. The cylinder 14a is supplied with pressurized oil by an oil pump P from an oil reservoir 17 passing through a line pressure control valve LC and a transmission ratio control valve TR. The cylinder 15a is applied with pressurized oil from the pump P. The hydraulic control circuit is responsive to vehicle speed, engine speed and throttle valve position for controlling the amount of oil supplied to the cylinders 14a and 15a. The pulleys 14 and 15 are operated by compressive forces of the cylinders so that the running diameter of the belt 16 varies to infinitely change the transmission ratio.

An electronic control system for the clutch 2 and the belt-drive transmission 4 has an engine speed sensor 19, and rotating speed sensors 21 and 22 for respectively sensing rotating speeds of drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing a driving position (D), neutral position (N) and reverse position (R). An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal to the clutch 2 and a control signal for controlling the transmission ratio (i) and a line pressure control signal to the control circuit.

Figure 2A:
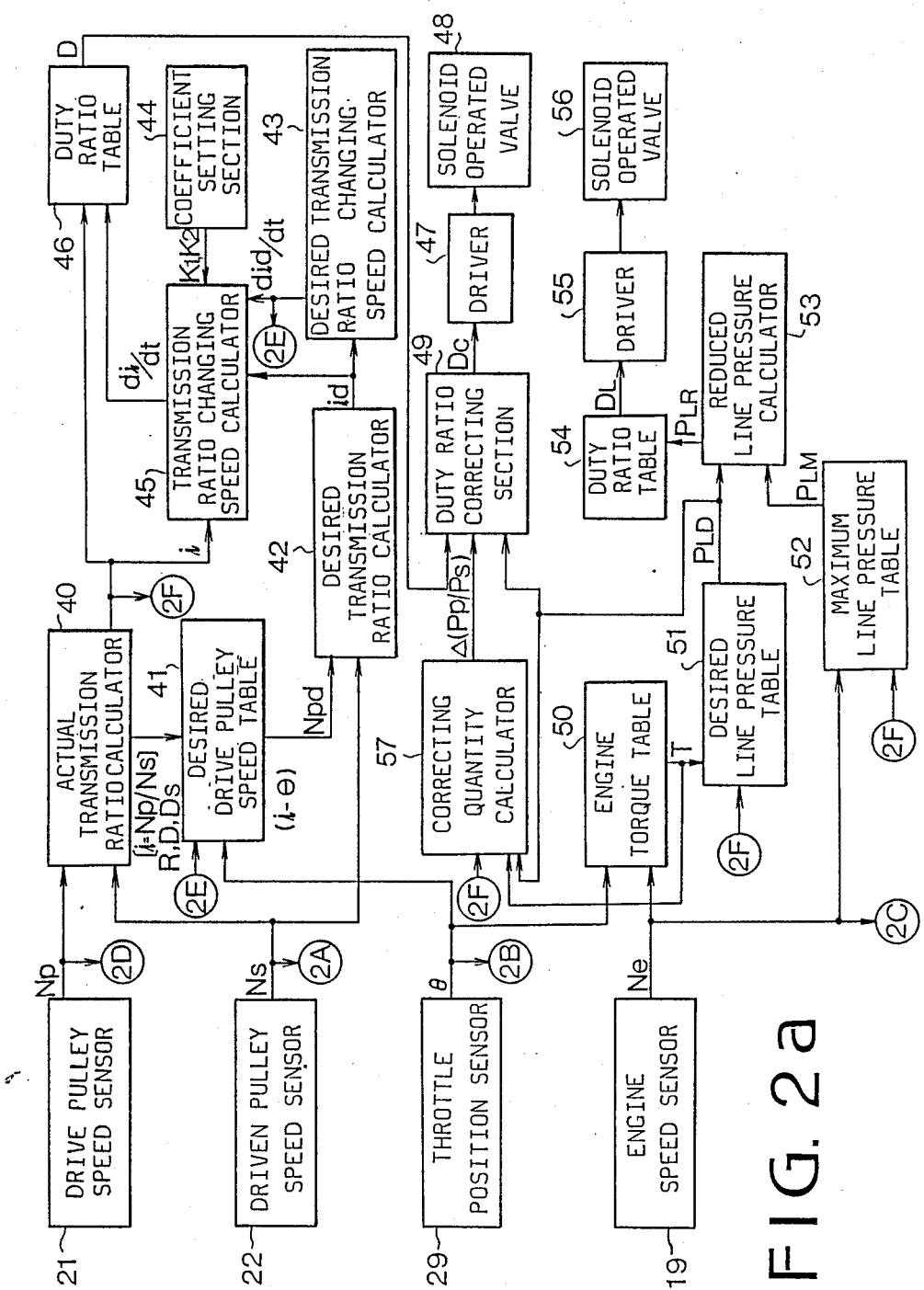
FIGS. 2a and 2b show a block diagram of a control unit according to the present invention.
Figure 2B:
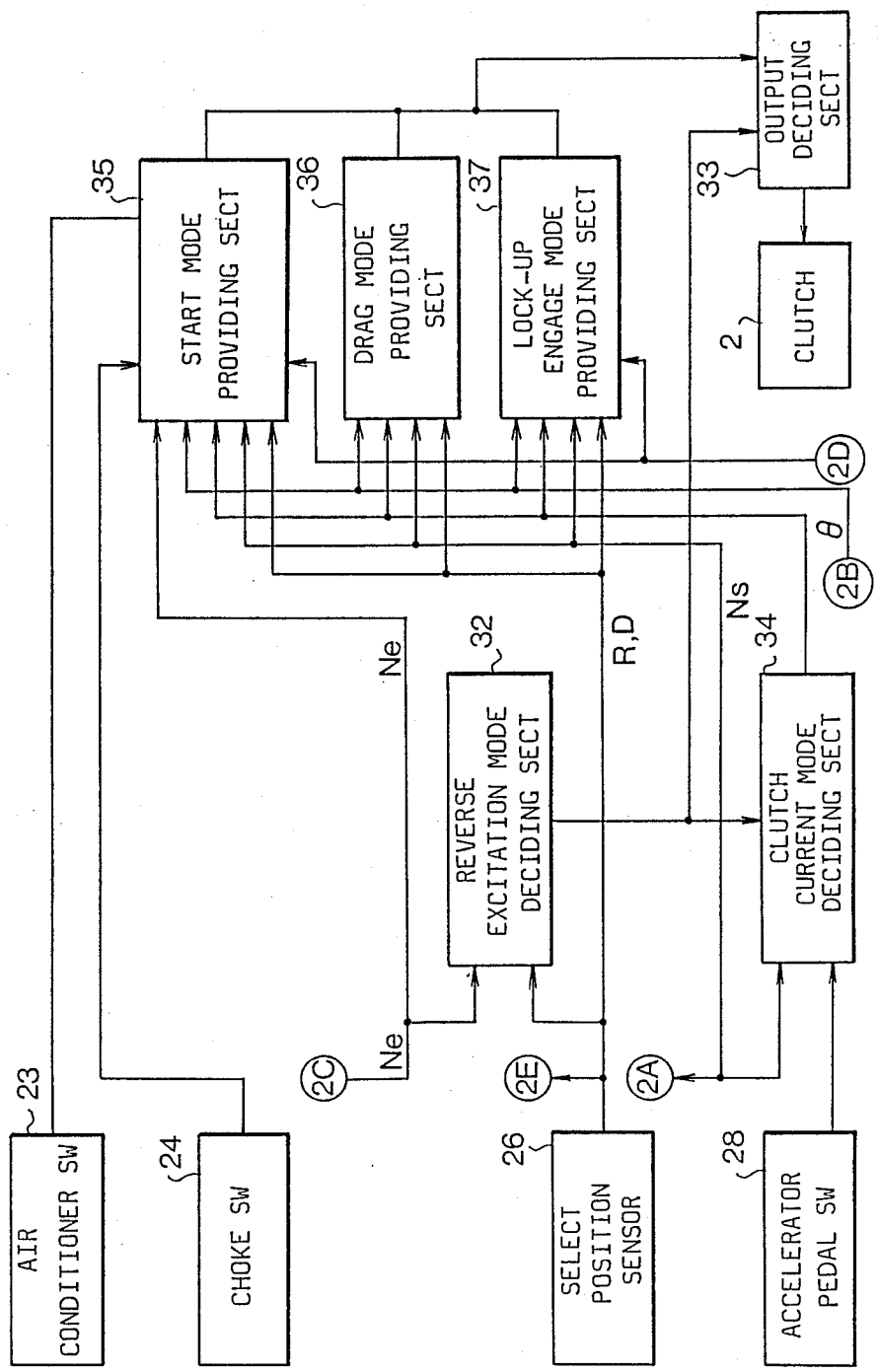

Referring to FIGS. 2a and 2b showing the control unit 20 of FIG. 1, a reverse excitation mode deciding section 32 is applied with engine speed signal Ne of the sensor 19 and drive position signal of the select position sensor 26. When the engine speed Ne is below 300 rpm, or the selector lever 25 is at the neutral position (N) or a parking position (P), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at ordinary start or at closing of the choke switch 24 or air conditioner switch 23. The starting characteristic is corrected by signals from the throttle valve opening degree $\theta$, vehicle speed V, and driving positions (D) and reverse position (R).

The drag mode providing section 36 decides a small drag current for providing a drag torque to the clutch 2 for the reduction of clearances formed in the transmission and for the smooth start of the vehicle when the accelerator pedal 27 is released at a low speed in the driving position and the reverse position.

The clutch lock-up engage mode providing section 37 decides a lock-up current in response to the vehicle speed V and throttle opening degree $\theta$ at the driving position and reverse position for entirely engaging the clutch 2. Outputs of sections 35, 36 and 37 are applied to the output deciding section 33 to control the clutch current.

A system for controlling the transmission ratio and the line pressure will now be described. Output signals $N_P$ and $N_S$ of the sensors 21, 22 are fed to an actual transmission ratio calculator 40 to produce an actual transmission ratio i in accordance with $i=N_P/N_S$. The actual transmission ratio i and output signal $\theta$ of the throttle position sensor 29 are fed to a desired drive pulley speed table 41 to derive a desired drive pulley speed Npd in accordance with values of the ratio i and signal $\theta$. The desired drive pulley speed Npd and the driven pulley speed Ns are fed to a desired transmission ratio calculator 42 to calculate a desired transmission ratio id in accordance with the speeds Npd and Ns which corresponds to vehicle speed.

The desired transmission ratio id is fed to a desired transmission ratio changing speed calculator 43 which produces a desired transmission ratio changing speed (rate) did/dt. The speed did/dt is the amount of change of the desired transmission ratio id during a predetermined time interval. A coefficient setting section 44 is provided for producing coefficients K1 and K2. The actual transmission ratio i, desired transmission ratio id, desired transmission ratio changing speed (rate) did/dt and coefficients K1 and K2 are applied to a transmission ratio changing speed calculator 45 to produce a transmission ratio changing speed (rate) di/dt from the following formula.

$$di/dt = K1(id-i) + K2 \cdot did/dt$$

In the formula, the term of (id−i) is a control quantity dependent on the difference between the desired and actual transmission ratios and did/dt is a term for advancing the delay in phase caused by a first order lag in the system.

The speed (rate) di/dt and actual ratio i are applied to a duty ratio table 46 to derive a duty ratio D in accordance with D=f(di/dt, i) using a table at upshift and downshift of the transmission. The duty ratio D is supplied to a solenoid operated on-off valve 48 through a driver 47. The valve 48 is provided in the hydraulic circuit, for shifting a spool of the transmission ratio control valve TR to control the transmission ratio.

On the other hand, engine speed Ne from the engine speed sensor 19 and throttle opening degree $\theta$ from the throttle position sensor 29 are applied to an engine torque table 50 to derive an engine torque T. The engine torque T and the actual transmission ratio i from the calculator 40 are applied to a desired line pressure table 51 to derive a desired line pressure $P_{LD}$.

In a hydraulic circuit of the control system, oil pressure discharged from the pump varies in accordance with the change of the engine speed Ne, so that a maximum line pressure $P_{LM}$ also varies. In order to detect the variance of the maximum line pressure $P_{LM}$, the control unit is provided with a maximum line pressure table 52 to which the engine speed Ne and the actual transmission ratio i are supplied. Therefore, the maximum line pressure $P_{LM}$ is obtained.

The desired line pressure $P_{LD}$ and the maximum line pressure $P_{LM}$ are applied to a reduced line pressure calculator 53 wherein a reduced line pressure $P_{LR}$ is calculated based on the proportion of the desired line pressure $P_{LD}$ to the maximum line pressure $P_{LM}$. The reduced line pressure $P_{LR}$ is applied to a duty ratio table 54 to derive a duty ratio $D_L$ corresponding to the reduced line pressure $P_{LR}$. The duty ratio $D_L$ is supplied to driver 55 which operates a solenoid operated on-off valve 56 at the duty ratio. The valve 56 is provided in the hydraulic circuit, for shifting a spool of the line pressure control valve LC to control the line pressure.

Figure 3:
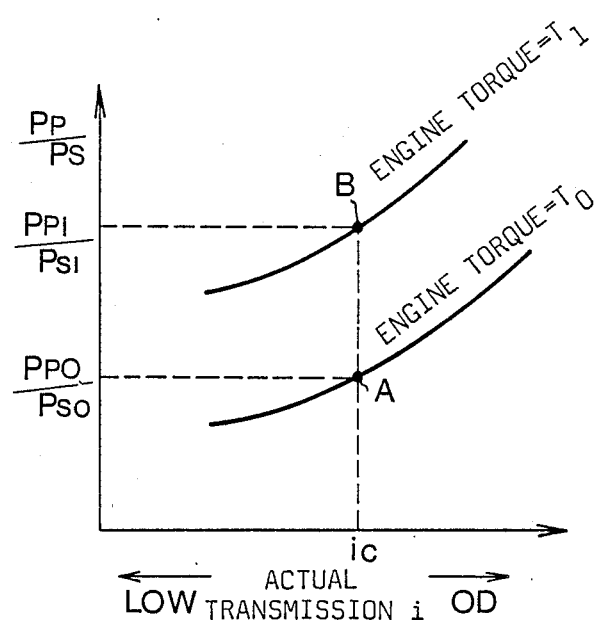
FIG. 3 is a graph showing relationships between ratio of pressures of oil supplied to drive and driven pulleys and engine torque.

FIG. 3 shows the relationship between engine torque and ratio of pressure $P_P$ of oil supplied to the drive pulley cylinder 14a to pressure $P_S$ of oil supplied to the driven pulley cylinder 15a. When engine torque $T_O$ increases to engine torque $T_1$, the ratio $P_P/P_S$ for keeping an actual transmission ratio ic changes from a ratio $P_{PO}/P_{SO}$ at a point A on line $T_O$ to a ratio $P_{P1}/P_{S1}$ at a point B on line $T_1$. In other words, in order to keep the transmission ratio ic, the ratio $P_{PO}/P_{SO}$ should be changed to the ratio $P_{P1}/P_{S1}$.

Figure 5:
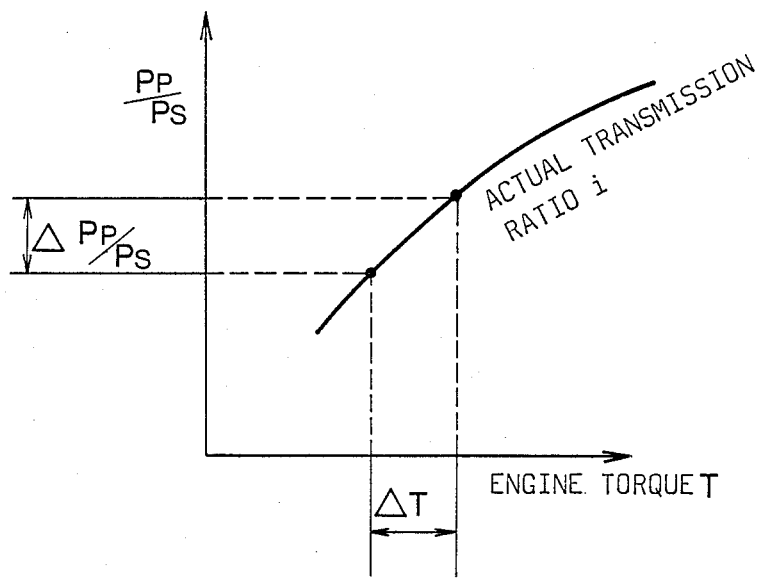
FIG. 5 is a graph showing a relationship between engine torque and ratio of drive and driven pulley pressures.
Figure 6:
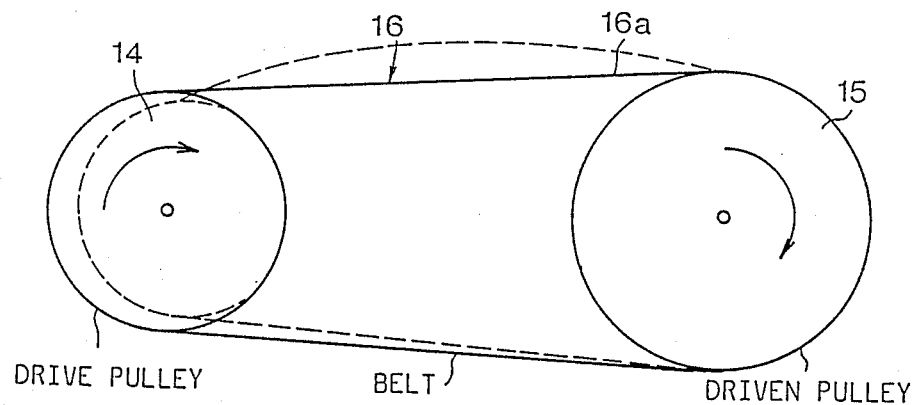
FIG. 6 is a schematic diagram of the drive and driven pulleys and a belt.

FIG. 5 shows a correcting quantity $\Delta P_P/P_S$ corresponding to an increment $\Delta T$ of the engine torque T. The system of the present invention is to correct transmission ratio with the correcting quantity $\Delta P_P/P_S$.

The control system of the present invention is provided with a correcting quantity table or calculator 57 to which engine torque T derived from the engine torque table 50, desired line pressure $P_{LD}$ from the desired line pressure table 51 and the actual transmission ratio i from the actual transmission ratio calculator 40 are fed. A correcting quantity $\Delta(P_P/P_S)$ is derived from the table and applied to a duty ratio correcting section 49. The desired line pressure $P_{LD}$ is further applied to the duty ratio correcting section 49. Thus, the duty ratio D is corrected to a corrected duty ratio Dc in accordance with the desired line pressure $P_{LD}$ and correcting quantity $\Delta P_P/P_S$. The duty ratio Dc is supplied to the solenoid operated on-off valve 48 through the driver 47.

In operation, while the vehicle stops, cylinder 15a of the driven pulley 15 is supplied with line pressure, and the cylinder 14a of the drive pulley 14 is drained, since $N_P$, $N_s$, $\theta$ and duty ratio D are zero. Thus, in the pulley and belt device of the continuously variable belt-drive transmission, the drive belt 16 engages with the driven pulley 15 at a maximum running diameter to provide the largest transmission ratio (low speed stage).

When the accelerator pedal 27 is depressed, the clutch current increases progressively with increase of engine speed. The electromagnetic clutch 2 is gradually engaged, transmitting the engine power to the drive pulley 14. The power of the engine is transmitted to the output shaft 13 at the largest transmission ratio by the drive belt 16 and driven pulley 15, and further transmitted to axles of the driving wheels 9. Thus, the vehicle is started. When the vehicle speed (output signal $N_s$) exceeds a predetermined value, the clutch 2 is entirely engaged.

When the throttle valve is opened for acceleration of the vehicle, the desired transmission ratio id is calculated at the calculator 42 based on the desired drive pulley speed derived from the table 41 and on the throttle position $\theta$. Further, the desired transmission ratio changing speed (rate) did/dt and transmission ratio changing speed (rate) di/dt are calculated at calculators 43 and 45 based on the actual transmission ratio i, desired transmission ratio id and coefficients $K_1$ and $K_2$. The transmission ratio changing speed (rate) di/dt is fed to the duty ratio table 46, so that duty ratio D for valve 48 is obtained from the table 46.

When the accelerator pedal is released, the transmission ratio changing speed (rate) di/dt becomes negative. Accordingly the value of the duty ratio D becomes larger than the neutral value, so that oil is supplied to the cylinder 14a to upshift the transmission. When the actual transmission ratio i reaches the desired transmission ratio id, the changing speed (rate) di/dt becomes zero, so that the upshifting operation stops.

When the drive pulley speed is substantially constant, the desired transmission ratio id calculated based on the desired drive pulley speed Npd and the driven pulley speed Ns has the same value as the desired transmission ratio calculated based on the driven pulley speed Ns and throttle opening degree $\theta$. In a range where the drive pulley speed varies, a proper desired transmission ratio id is calculated based on a desired drive pulley speed Npd derived from the table 41.

As the difference between the desired ratio id and actual ratio i becomes large and the desired transmission ratio changing speed (rate) di/dt becomes large, the duty ratio D for the valve 48 becomes large, thereby increasing the actual transmission ratio changing speed (rate) di/dt.

When the opening degree of the throttle valve is reduced for deceleration, the duty ratio D is reduced along a low engine speed line, thereby draining the cylinder 14a. Thus, the transmission ratio is downshifted. The transmission changing speed (rate) at downshifting increases with reducing of the duty ratio D.

The control operation of line pressure will be described hereinafter. From the engine torque table 50, a torque T is obtained in accordance with throttle opening degree $\theta$ and engine speed $N_e$, which is applied to desired line pressure table 51. The desired line pressure $P_{LD}$ and the maximum line pressure $P_{LM}$ obtained from the table 52 are fed to the reduced line pressure calculator 53. The calculator 53 calculates a reduced line pressure $P_{LR}$. The solenoid operated on-off valve 56 is operated at a duty ratio $D_L$ corresponding to the reduced line pressure $P_{LR}$. The line pressure is applied to cylinder 15a to hold the belt 16 at a necessary minimum force, the transmitting torque at which is slightly larger than torque T. Thus, power is transmitted through the transmission without slipping of the belt.

Figure 4:
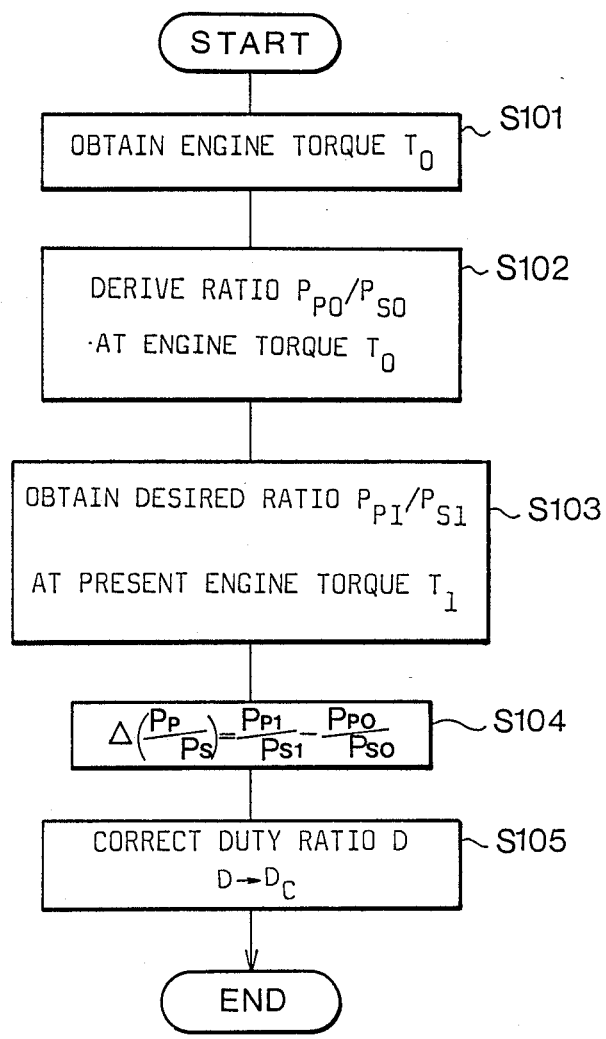
FIG. 4 is a flowchart showing the operation of a control system according to the present invention.

The operation is further described by the flowchart shown in FIG. 4.

At a step S101, the engine torque $T_O$ is obtained. At a step S102, the actual transmission ratio ic and the ratio $P_{PO}/P_{SO}$ at the engine torque $T_O$, namely at the point A in FIG. 3, is obtained. The increased engine torque $T_1$ and the ratio $P_{P1}/P_{S1}$ at the engine torque $T_1$ at the transmission ratio ic, namely at the point B, is obtained at a step S103. The correcting quantity $\Delta(P_P/P_S)$ is calculated at a step S104 and the duty ratio D is corrected dependent on the quantity $\Delta(P_P/P_S)$ to the corrected duty ratio Dc at a step S105. Thus, the pulley pressure ratio $P_P/P_S$ is increased to the ratio $P_{P1}/P_{S1}$ so that the transmission ratio ic is exactly controlled to a desired transmission ratio.

In the above described system, cases frequently occur where the engine torque increases during the upshifting or downshifting of the transmission. In the case that the drive pulley cylinder pressure is increased during the downshifting, speed of the downshifting is reduced. During the upshifting, speed of the upshifting is increased.

Figure 7:
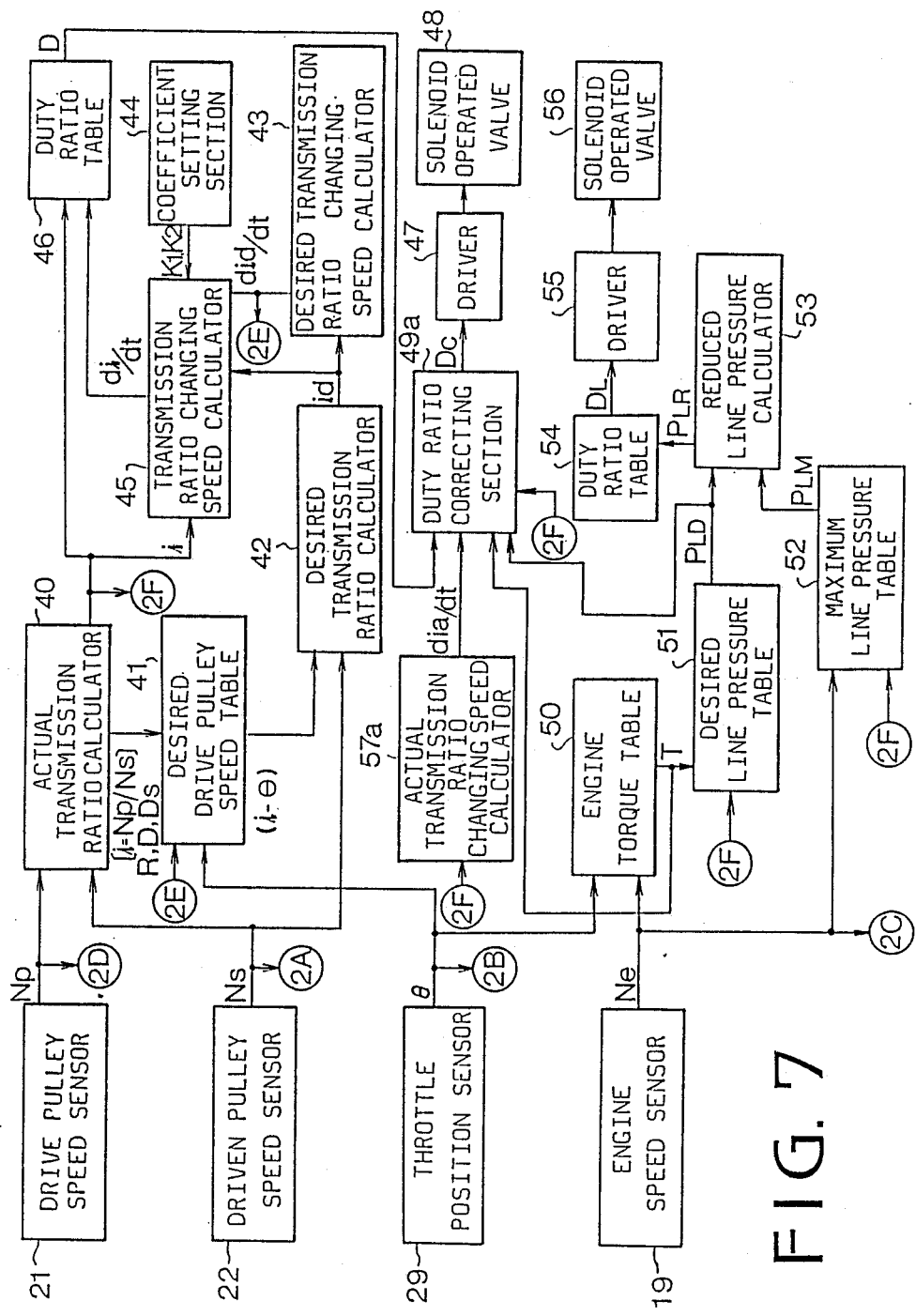
FIG. 7 shows a main part of a system in another embodiment of the present invention.

The system shown in FIG. 7 is to resolve such a problem. The same parts as the system of FIGS. 2a and 2b are identified by the same references as FIGS. 2a and 2b.

Figure 8:
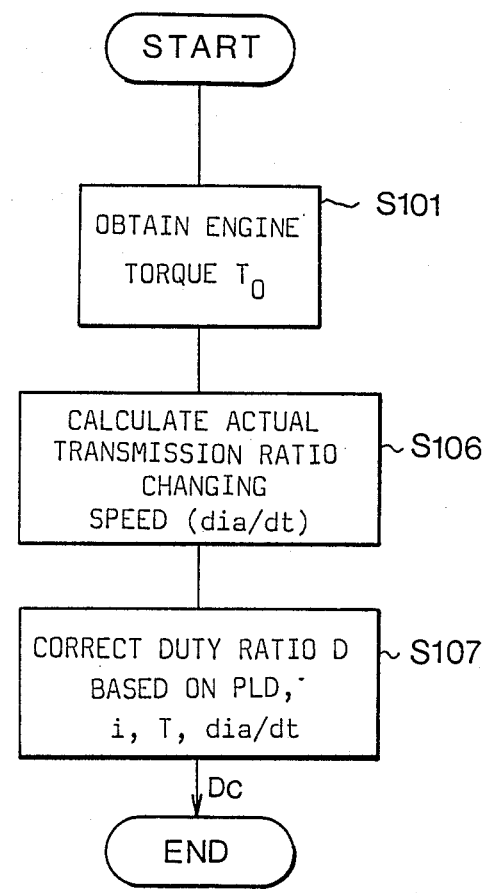
FIG. 8 is a flowchart showing the operation of the system.

The system of FIG. 7 is provided with an actual transmission ratio changing speed calculator 57a where actual transmission ratio changing speed (rate) dia/dt is calculated based on change of the transmission ratio i. That is to say, the actual transmission ratio changing speed dia/dt is obtained by differentiating the changing amount of the transmission ratio by the elapsed time t. The changing speed (rate) dia/dt is applied to a duty ratio correcting section 49a to which actual transmission ratio i, engine torque T derived from the engine torque table 50 and desired transmission ratio $P_{LD}$ are fed. In the duty ratio correcting section 49a, a ratio k, which is a ratio of oil pressures $P_P$ and $P_S$ applied to the cylinders of the drive and driven pulleys, is obtained in dependency on the torque T and actual transmission ratio. The duty ratio D is corrected in the correcting section 49a to produce a corrected duty ratio Dc. The duty ratio Dc is supplied to solenoid operated on-off valve 48 through the driver 47. Thus, the pressure in the drive pulley cylinder is properly increased. FIG. 8 shows the operation of the system.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A control system for a continuously variable transmission for transmissing power of an internal combustion engine mounted on a motor vehicle, the transmission comprising a drive pulley having a hydraulically shiftable first disc and a first hydraulic cylinder for operating said disc, a driven pulley having a hydraulically shiftable second disc and a second hydraulic cylinder for operating said second disc, and a belt engaged with said both pulleys, the control system comprising a first hydraulic circuit having a pump for supplying oil to both said first and second hydraulic cylinders, a transmission ratio control valve in said first hydraulic circuit for controlling the oil supplied to said first hydraulic cylinder of said drive pulley to change transmission ratio of the transmission to a desired transmission ratio, a second hydraulic circuit having a solenoid operated valve for operating said transmission ratio control valve, the control system comprising a throttle position sensor for detecting position of a throttle valve of the engine to control power of said engine and for producing a throttle position signal, an actual transmission ratio calculator responsive to speeds of said drive and driven pulleys for producing an actual transmission ratio signal, and an engine speed sensor for detecting engine speed and for producing an engine speed signal, the improvement in the control system which comprises:

detector means responsive to said throttle position signal and said engine speed signal for detecting an increase of an output torque of said engine and for producing an engine torque increase signal;

means responsive to said engine speed signal and said actual transmission ratio signal for providing a maximum line pressure in accordance with driving conditions of said vehicle;

desired line pressure means responsive to said actual transmission ratio signal and said engine torque increase signal for producing a desired line pressure signal;

correcting means responsive to said engine torque increase signal, said actual transmission ratio signal and said desired line pressure signal for producing a correcting quantity signal so as to control pressure of the oil supplied to said first hydraulic cylinder of said drive pulley so as to prevent downshifting of said transmission ratio in spite of existence of said engine torque increase signal;

a reduced line pressure calculator means responsive to said desired line pressure signal and said maximum line pressure signal for producing a reduced line pressure signal for reducing pressure of the oil in the first hydraulic circuit; and control means responsive to said correcting quantity signal to operate said solenoid operated valve so as to prevent downshifting of said transmission ratio in spite of existence of said engine torque increase signal.

2. The system according to claim 1 wherein the correcting means corrects a difference between pressures of oils in the cylinder of the drive pulley and the cylinder of the driven pulley.

3. The system according to claim 1 wherein the correcting means corrects the correcting quantity signal in accordance with actual transmission ratio changing speed.

4. The control system according to claim 1, wherein said control means responding to said correcting quantity signal increase pressure in said first hydraulic cylinder by a movement.

5. The control system according to claim 1, wherein said detector means is an engine torque table.

6. A control system for a continuously variable transmission for transmission power of an internal combustion engine mounted on a motor vehicle, the transmission comprising a drive pulley having a hydraulically shiftable first disc and a first hydraulic cylinder for operating said disc, a driven pulley having a hydraulically shiftable second disc and a second hydraulic cylinder for operating said second disc, and a belt engaged with said both pulleys, the control system comprising a first hydraulic circuit having a pump for supplying oil to both said first and second hydraulic cylinders, a transmission ratio control valve in said first hydraulic circuit for controlling the oil supplied to said first hydraulic cylinder of said drive pulley to change transmission ratio of the transmission to a desired transmission ratio, a second hydraulic circuit having a solenoid operated valve for operating said transmission ratio control valve, the control system comprising a throttle position sensor for detecting position of a throttle valve of the engine to control power of said engine and for producing a throttle position signal, an actual transmission ratio calculator responsive to speeds of said drive and driven pulleys for producing an actual transmission ratio signal, and an engine speed sensor for detecting engine speed and for producing an engine speed signal, the improvement in the control system which comprises:

detector means responsive to said throttle position signal and said engine speed signal for detecting an increase of an output torque of said engine and for producing an engine torque increase signal;

desired line pressure means responsive to said actual transmission ratio signal and said engine torque increase signal for producing a desired line pressure signal;

correcting means responsive to said engine torque increase signal, said actual transmission ratio signal and said desired line pressure signal for producing a correcting quantity signal so as to control pressure of the oil supplied to said first hydraulic cylinder of said drive pulley so as to prevent downshifting of said transmission ratio in spite of existence of said engine torque increase signal; and control means responsive to said correcting quantity signal to operate said solenoid operated valve so as to prevent downshifting of said transmission ratio in spite of existence of said engine torque increase signal.

* * * * *